May 7, 1968 D. W. TAYLOR 3,382,401

SELF-OSCILLATING DEFLECTION CIRCUIT HAVING
A SERIES RESONANT FEEDBACK CIRCUIT
Filed Sept. 25, 1964

Inventor
DOUGLAS W. TAYLOR

BY

Mueller & Aichele

ATTYS.

United States Patent Office 3,382,401

Patented May 7, 1968

3,382,401

SELF-OSCILLATING DEFLECTION CIRCUIT HAVING A SERIES RESONANT FEEDBACK CIRCUIT

Douglas W. Taylor, Phoenix, Ariz., assignor to Motorola, Inc., Franklin Park, Ill., a corporation of Illinois Filed Sept. 25, 1964, Ser. No. 399,146

8 Claims. (Cl. 315—27)

ABSTRACT OF THE DISCLOSURE

A TV deflection system providing a signal at the horizontal deflection frequency of a cathode ray tube and including a deflection winding coupled between a DC power supply and a switching transistor. A series resonant circuit is connected in a feedback network between the deflection winding and the switching transistor and resonates at the horizontal deflection frequency to alternately bias the switching transistor into conduction. The feedback network includes a magnetic core, the inductance of which is variably controlled by an error signal in a phase locked loop which is connected between the deflection winding and the magnetic core. The error signal locks the resonant frequency of the series resonant circuit at the horizontal deflection frequency.

Figures 1, 2:
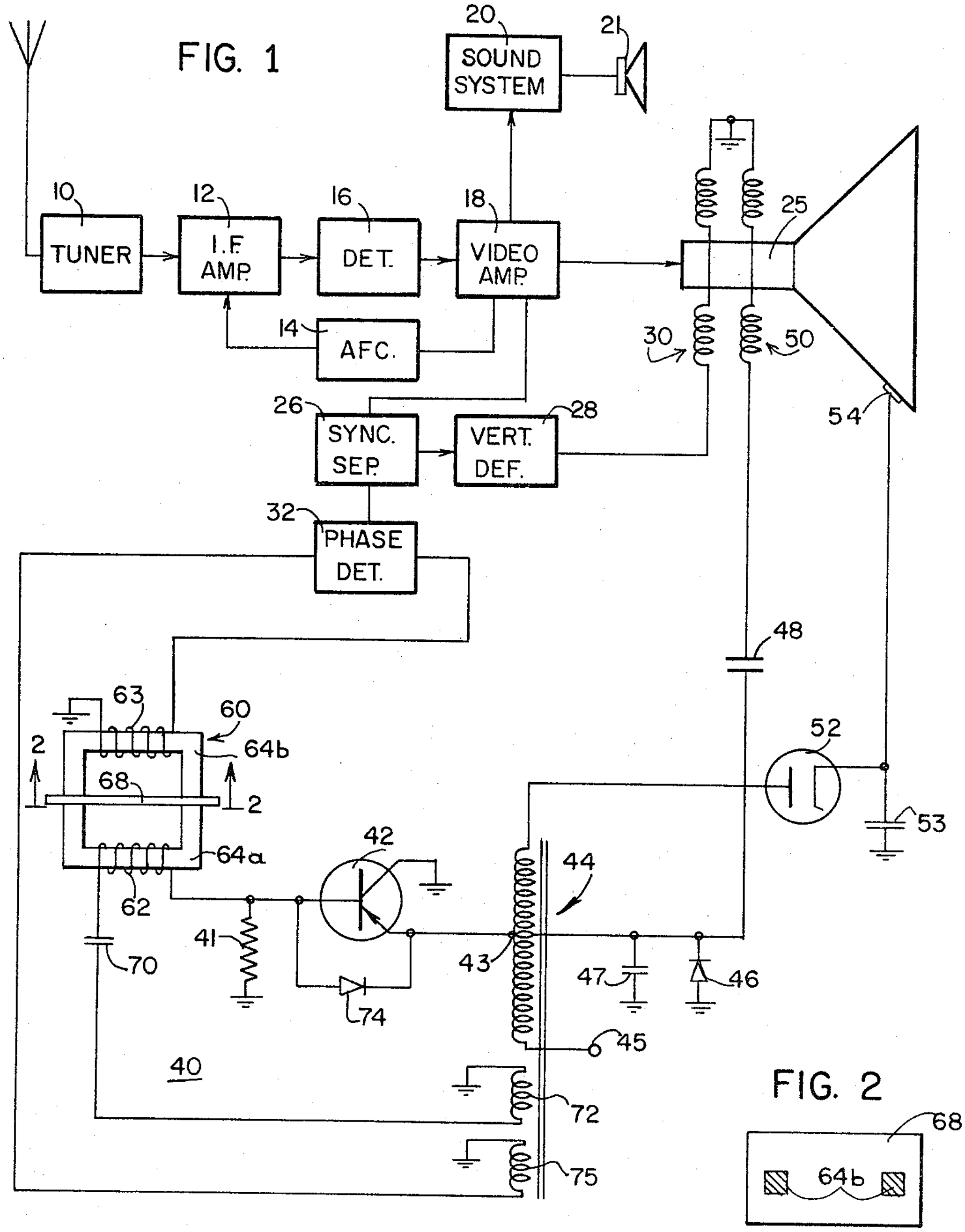

This invention relates to deflection systems for television receivers and more particularly to a transistorized self-oscillating horizontal deflection system having frequency control.

The basic horizontal deflection system for television receivers includes a switch for periodically supplying current through a flyback transformer winding and the deflection yoke for the cathode ray tube of the receiver during the trace portion of the deflection wave. At the end of a predetermined period (the end of trace) current is interrupted by abrupt opening of the switch and energy stored in the transformer winding and yoke is released and transferred to a storage capacitor by a resonance action (during the retrace portion of the deflection wave) and back to the deflection yoke and transformer winding at the end of retrace. A damper diode is coupled across the deflection winding to provide a discharge path for energy stored in the deflection yoke and the transformer winding, and to prevent ringing. This operation is repeated by periodically opening and closing the switch at horizontal deflection frequency.

The switch may, for example, be a semiconductor device such as a transistor which is periodically made conducting and non-conducting by application of a square wave to its control electrode. In the usual horizontal deflection system the square wave is generated by a separate horizontal oscillator stage and is synchronized with a synchronizing signal component of the received composite video signal by a suitable frequency control arrangement.

It is desirable, in order to reduce cost and increase reliability, to decrease the number of components in the receiver. One possibility is to utilize the switching transistor of the horizontal deflection system in a manner such that a separate driving wave for switching of the transistor is not required, thereby eliminating the horizontal oscillator stage. The system, therefore, becomes self-oscillating.

Self-oscillating horizontal deflection systems, particularly those using transistors as the switching device, have not been entirely satisfactory in the past. One common type of self-oscillating system employs a blocking oscillator circuit arrangement. However, blocking oscillators require critical time constant and saturating inductors for proper operation, and are extremely voltage sensitive, thus lacking the stability and reliability required for horizontal deflection and television receivers. In addition, the critical time constants required by blocking oscillator circuits make them less desirable for use with the automatic frequency control arrangements required to properly lock the horizontal deflection wave with a synchronizing signal.

A further important consideration in transistorized horizontal deflection systems is the fact that in order to provide turn-off within a prescribed retrace interval a high-speed, diffused base switching transistor is often used. However, such transistors exhibit low reverse-bias, base-emitter breakdown voltage, and the circuit should be adapted to avoid base-emitter breakdown.

It is therefore an object of the present invention to provide an improved transistorized self-oscillating horizontal deflection system for television receivers.

Another object of the invention is to provide a self-oscillating transistorized horizontal deflection system with frequency control that is simple in construction and stable in operation.

A further object of the invention is to provide a simple, highly stable transistorized horizontal deflection system for television receivers utilizing a minimum of circuit components for increased reliability and reduced cost.

Other objects, as well as the features and attending advantages of the invention, will become apparent from the following description when taken in conjunction with the accompanying drawings in which:

FIG. 1 is a diagram of a television receiver partly in block, and partly in schematic representation to illustrate the invention; and FIG. 2 is a cross-sectional view of the variable inductance used to provide frequency control in the circuit of FIG. 1, taken along lines 2—2.

In a specific form of the invention there is provided a horizontal deflection system including a switching transistor with its collector and emitter connected between a tap point on a principal flyback transformer winding and a reference potential, which transistor is adapted to be periodically switched into conduction to complete a current path through the winding to produce a linearly rising sawtooth current wave for application to the deflection yoke of a cathode ray tube. At the end of a predetermined interval the transistor is switched to non-conduction and energy stored in the principal flyback winding (and the deflection yoke coupled thereto) is transferred to a storage capacitor and back to the winding and deflection yoke. There is a further linear discharge of current through a damper diode, and the transistor is again switched into conduction to repeat the cycle. A direct current voltage is applied to a further tap point on the principal flyback transformer winding to supply the required current for the system.

A series resonant circuit including variable inductance means and a capacitor, sharply tuned to horizontal deflection frequency, is coupled between the base of the switching transistor and a feedback winding on the flyback transformer, and in conjunction with a diode coupled between the base and emitter of the switching transistor provides a feedback network to make the system self-oscillating. The variable inductance means of the series resonant circuit consists of a winding on a first magnetic core section of a material whose permeability is a function of the total core flux density. The total flux density in turn is controlled by passing direct current through a control winding on a second magnetic core section. The magnetic core consists of two sections, a C-core of ferrite material to produce a high Q inductance for the series resonant circuit, and a C-core of high permeability iron to provide high sensitivity to the control current. The juncture of the pole faces of the two C-cores is surrounded by a shorted turn to provide AC isolation of the inductance winding and the control winding.

Referring now to FIG. 1, the horizontal deflection system of the invention is shown incorporated in a television receiver of the standard type. Tuner 10, which may include an RF amplifier and suitable mixer and oscillator, provides a signal of a fixed frequency for intermediate amplifier 12. Both tuner 10 and IF amplifier 12 are controlled by a gain control voltage from AGC stage 14 in accordance with the usual practice. A selected and amplified signal is applied to detector 16, the output of which is connected to video amplifier stage 18. The FM sound subcarrier of the demodulated signal is applied to sound system 20, wherein the audio signal is derived and amplified in order to drive loudspeaker 21.

Video amplifier 18 also supplies a video signal to drive cathode ray tube 25. Video amplifier 18 is further connected to synchronizing signal separator 26, which amplifies and separates the vertical and horizontal synchronizing components of the received composite video signal after it is demodulated by detector 16. The vertical synchronizing component (60 cycles per second) is applied to vertical deflection system 28 to produce a suitable driving current for vertical deflection yoke 30, on the neck of cathode ray tube 25. Synchronizing signal separator 26 is also connected to phase detector 32 to produce a direct current control voltage to synchronize the horizontal deflection system of the receiver with respect to the received signal in a manner subsequently described.

The self-oscillating horizontal deflection system of the invention is shown generally at 40. Transistor 42 has its emitter connected to the tap point 43 on flyback transformer 44 and its collector returned to ground reference potential. Resistor 41 returns the base of transistor 42 to ground reference potential to provide bias therefor. A DC voltage is applied to one end of transformer 44 at terminal 45. Tap point 43 is also returned to ground reference potential by damper diode 46, shunted by capacitor 47. Tap point 43 on transformer 44 is also coupled, via wave-shaping and DC blocking capacitor 48, to horizontal deflection yoke 50, positioned on the neck of cathode ray tube 25. The other end of transformer 44 is connected to the anode of high voltage rectifier 52. The cathode of rectifier 52 is returned to ground reference potential by filter capacitor 53, and also connected to the second anode terminal 54 of cathode ray tube 25.

The horizontal deflection system so far described is of the usual type wherein periodic conduction of transistor 42 (as may be caused by application of a driving signal to its base) results in current flow from terminal 45, through transformer 44 and the collector-emitter junction of transistor 42, to ground reference potential. This in turn results in a linearly varying current waveform which is supplied to horizontal deflection yoke 50 for deflection of the electron beam of cathode ray tube 25. At the end of trace, transistor 42 is cut off and energy stored in transformer 44 and yoke 50 is transferred between capacitor 47 as a result of a ringing action, with conduction of damper diode 46 limiting the ringing to one-half cycle of oscillation and returning the stored energy to the DC supply of the receiver. This ringing action results in half-wave voltage pulses in principal flyback winding on transformer 44, which pulses are stepped up and rectified by rectifier 52 to produce second anode voltage for cathode ray tube 25.

In order to make the described horizontal deflection system self-oscillating in accordance with the present invention, the base of transistor 42 is connected to one end of winding 62 on core 64*a* of inductor 60. The other end of winding 62 is connected to one side of capacitor 70, and the other side of capacitor 70 is connected to feedback winding 72 on transformer 44. The inductance of winding 62 and capacitor 70 are series resonant at horizontal deflection frequency (15.75 kc.). Diode 74 is connected between the base and emitter of transistor 42. Thus diode 74 shunts the base-emitter diode of transistor 42. In addition, diode 74 is poled oppositely to the base-emitter diode of transistor 42 so that for the PNP transistor shown the anode of diode 74 is connected to the base of transistor 42, with the cathode of diode 74 returned to the emitter of transistor 42.

The inductance that winding 62 presents in the series resonant circuit it forms with capacitor 70 is made variable by varying the total flux in core 64*a*. This is achieved by passing a DC control current through winding 63 of core 64*b*. Cores 64*a* and 64*b* may be C-cores having their pole faces abutting against one another, with the juncture of each pole face surrounded by a shorted turn provided by apertures in non-magnetic, highly conductive metallic plate 68. This may be seen in FIG. 2, which is a cross-sectional view taken along lines 2—2 to show a plane view of plate 68, and illustrating the manner in which the pole faces of C-cores 64*a* and 64*b* extend through the apertures in plate 68.

The total flux through cores 64*a* and 64*b* is a function of the DC current through winding 63. Since a high Q is desirable for the series resonant circuit of winding 62 and capacitor 70, core 64*a* is a ferrite core. However, since such cores saturate at relatively low flux densities, resulting in reduced sensitivity and control range when a DC current is applied to control windings thereon, core 64*b* is of a high permeability material such as soft iron. Plate 68 is of copper or aluminum and, as mentioned, provides a shorted turn around the juncture of the pole faces of cores 64*a* and 64*b*. This provides AC isolation so that there is no AC coupling between windings 62 and 63, and also prevents ringing of winding 62 and further eliminates necessity for decoupling networks for the circuit used in applying DC current to winding 63. The net effect provides a high Q inductor that is variable in response to a DC current, and the series resonant circuit that the inductor forms with capacitor 70 is not influenced by the associated circuitry or the manner in which DC current is applied to winding 63.

The DC control current for windings 63 may be provided in response to the output of phase detector 32 to synchronize the deflection wave with the synchronizing signal component of the detected video signal. To this end, phase detector 32 (which may be of the usual type employed in television receivers), receives a first input from synchronizing signal separator circuit 26 and a second input from winding 75 on transformer 44. Any difference in the timing of retrace pulses induced in winding 75 and the horizontal synchronizing pulses derived from synchronizing signal separator circuit 26 produces a DC output for phase detector 36, resulting in a shift in the resonant frequency established by winding 62 in capacitor 70. This arrangement therefore provides an automatic frequency control loop to lock the generated horizontal deflection wave with the horizontal synchronizing component of the received video signal. In addition, the current through winding 63 may be manually adjusted, such as by a control potentiometer, to provide a horizontal hold control for the receiver.

The resonant circuit including capacitor 70 and winding 62 is excited to resonate at the horizontal deflection frequency (15.75 kc.) by positive-going flyback pulses induced in feedback winding 72. This initially produces a positive voltage swing at the base of transistor 42 so that transistor 42 is cutoff and diode 74 conducts. Thus during the first half cycle of oscillation of the series resonant circuit of capacitor 70 and winding 62, transistor 42 is cutoff and retrace resonance occurs between deflection yoke 50 (and flyback transformer 44) and capacitor 47. A half wave sinusoidal voltage pulse (positive with respect to the voltage applied to terminal 45) is produced across capacitor 47 to bias damper diode 46 off. The width of this voltage pulse corresponds to the retrace interval of a standard television horizontal deflection wave. A subsequent voltage reversal across capacitor 47 causes damper diode 46 to conduct clamping the voltage across capacitor 47 to the level of the forward drop of diode 46 and resulting in a sawtooth current wave (a linear decay of current in yoke 50 and transformer 44) until the current through damper diode 46 reaches zero at which time damper diode 46 is again biased off. This linear current decay effectively returns energy to the DC supply of the receiver (minus losses) via terminal 45.

As the current through damper diode 46 approaches zero, there is a voltage reversal in the series resonant circuit of capacitor 70 and winding 62 so that transistor 42 conducts and diode 74 becomes cut off. During this interval current now increases linearly through transformer 44 and yoke 50, continuing until a desired level of current is reached. The maximum current rise corresponds to a complete cycle of oscillation of the series resonant circuit of capacitor 70 and winding 62. Subsequently a voltage reversal takes place at the base of transistor 42, again swinging positive to cut it off and to initiate the flyback pulse in transformer 44. Because of the regenerative feedback provided by winding 72, the series resonant circuit of capacitor 70 and winding 62 is excited in a manner to enhance cutoff of transistor 42, and the above described operation is repeated.

By providing the series resonant circuit of capacitor 70 and winding 62 with a high effective Q, frequency stable operation results. As mentioned, the high Q circuit may be provided by making core 64*a* for winding 62 of a ferrite material. In addition, the series resistance in the series resonant circuit may be minimized by utilizing a highly conductive diode for diode 74 (such as a gold-doped diode) and by using a high-speed diffused-base switching transistor for transistor 42. Since either diode 74 or transistor 42 is conducting during a cycle of oscillation of the series resonant circuit, low forward resistance of diode 74 and of the base-emitter junction of transistor 42 prevents a shift in the Q of the circuit. In addition, diode 74 limits the reverse base-emitter voltage drop of transistor 42 and conducts heavily during the interval that maximum voltage is applied to the base of transistor 42, and this prevents reverse base-emitter breakdown of transistor 42 for improved reliability.

The invention provides, therefore, a simple, reliable, self-oscillating transistorized horizontal deflection circuit with frequency control for use with television receivers. While a particular embodiment of the invention has been shown and described, modifications may be made and it is intended in the appended claims to cover all such modifications as fall within the spirit and scope of the invention.

I claim:

1. In a deflection system providing a wave having a trace portion and a retrace portion at horizontal deflection frequency to the deflection yoke of a cathode ray tube, said deflection system having a principal flyback winding, direct current power supply means, a switching transistor with collector, emitter and base electrodes, means connecting a portion of said principal flyback winding and said collector and emitter electrodes in series between said power supply means and a reference potential, and a damper diode and retrace capacitance means coupled between the portion of said principal flyback winding and a reference potential, the combination including, inductance means and a capacitor connected in series between said base electrode and a further portion of said principal flyback winding, said inductance means and said capacitor forming a series resonant circuit adapted to resonate at horizontal deflection frequency, said further portion of said principal flyback winding regeneratively coupling flyback voltage pulses to said resonant circuit, and semiconductor diode means connected between said base and emitter electrodes, said semiconductor diode means poled oppositely to the base-emitter junction of said transistor.

2. In a deflection system providing a wave having a trace portion and a retrace portion at horizontal deflection frequency to the deflection yoke of a cathode ray tube, said deflection system having a principal flyback winding, direct current power supply means, a switching transistor with collector, emitter and base electrodes, means connecting a portion of said principal flyback winding and said collector and emitter electrodes in series between said power supply means and a reference potential, and damper diode and retrace capacitance means coupled between said principal flyback winding and a reference potential, the combination including electronically variable inductance means and a capacitor connected in series between said base electrode and a further portion of said principal flyback winding, said inductance means and said capacitor forming a series resonant circuit adapted to resonate at horizontal deflection frequency, said further portion of said principal flyback winding regeneratively coupling flyback voltage pulses to said resonant circuit, circuit means coupled to said inductance means to control the resonant frequency of said series resonant circuit in response to a direct current control signal, and semiconductor diode means connected between the base and emitter electrodes of said transistor, said semiconductor diode means poled oppositely to the base-emitter junction of said transistor.

3. In a deflection system providing a wave having a trace portion and a retrace portion at horizontal deflection frequency to the deflection yoke of a cathode ray tube, said deflection system having a flyback transformer with a principal flyback winding thereon, means for coupling the deflection yoke of the cathode ray tube to said principal flyback winding, direct current power supply means, a switching transistor having collector, emitter and base electrodes, means connecting said principal flyback winding and said collector and emitter electrodes in series between said power supply means and a reference potential, and damper diode means and retrace capacitance means coupled between said deflection winding and said reference potential, the combination including a feedback winding on said flyback transformer, electronically variable inductance means and a capacitor connected in series between said base electrode and said feedback winding, said inductance means and said capacitor forming a series resonant circuit adapted to resonate at horizontal deflection frequency, with said feedback winding regeneratively coupling flyback voltage pulses developed in said flyback transformer to said series resonant circuit, circuit means coupled to said inductance means to vary the resonance frequency of said series resonant circuit in response to a direct current control signal, and a semiconductor diode connected between the base and emitter electrodes of said transistor, said semiconductor diode poled oppositely to the base-emitter junction of said transistor.

4. In a television receiver having a deflection system providing a deflection wave having a trace portion and a retrace portion at horizontal deflection frequency to the deflection yoke of a cathode ray tube, said deflection system having a flyback transformer with a principal flyback winding thereon, means for coupling the deflection yoke of the cathode ray tube to said principal flyback winding, direct current power supply means, a switching transistor having collector, emitter and base electrodes, means connecting said principal flyback winding and said collector and emitter electrodes in series between said power supply means and a reference potential, and damper diode and retrace capacitance means coupled between said principal flyback winding and said reference potential, the combination including, a first feedback winding on said flyback transformer, electronically variable inductance means and a capacitor connected in series between said base electrode and said first feedback winding, said inductance means and said capacitance means forming a series resonant circuit adapted to resonate at horizontal deflection frequency, with said first feedback winding regeneratively coupling flyback voltage pulses developed in said flyback transformer to said series resonant circuit, a phase detector in the receiver having a first input coupled to the output of the synchronizing signal separator circuit of the receiver, a second feedback winding on said flyback transformer coupled to a second input of said phase detector, means coupling the output of said phase detector to said electronically variable inductance means to thereby synchronize the resonant frequency of said series resonant circuit with the horizontal synchronizing pulses of a composite video signal processed in the receiver, and a semiconductor diode connected between the base and emitter electrodes of said transistor, said semiconductor diode poled oppositely to the base-emitter junction of said transistor.

5. In a deflection system providing a wave having a trace portion and a retrace portion at horizontal deflection frequency to the deflection yoke of a cathode ray tube, said deflection system having a flyback transformer with a principal flyback winding thereon, means for coupling the deflection yoke of the cathode ray tube to said principal flyback winding, direct current power supply means, a switching transistor having collector, emitter and base, means connecting said principal flyback winding and said collector and emitter electrodes in series between said power supply means and a reference potential, and damper diode means and retrace capacitance means coupled between said principal flyback winding and said reference potential, the combination including, a closed magnetic circuit having a core of a first magnetic material and a core of a second magnetic material, each said core having pole faces abutting against one another, a shorted turn of non-magnetic conductive material surrounding the juncture of the pole faces of said cores, a winding on each said core, a capacitor, a feedback winding on said flyback transformer, means connecting the winding on one said core and said capacitor in series between said base electrode and said feedback winding, said capacitor and said winding on said one core forming a series resonant circuit adapted to resonate at horizontal deflection frequency, with said feedback winding regeneratively coupling flyback voltage pulses developed in said flyback transformer to said series resonant circuit, circuit means coupled to the winding on the other said core to supply variable direct current therethrough, and low impedance circuit means connected between base and emitter electrodes of said transistor.

6. The system of claim 5 wherein said low impedance circuit means includes a high conductance semiconductor diode poled oppositely to the base-emitter junction of said transistor.

7. In a deflection system providing a wave having a trace portion and a retrace portion at horizontal deflection frequency to the deflection yoke of a cathode ray tube, said deflection system having a flyback transformer with a principal flyback winding thereon, means for coupling the deflection yoke of the cathode ray tube to said principal flyback winding, direct current power supply means, a switching transistor having collector, emitter and base electrodes, means connecting said principal flyback winding and said collector and emitter electrodes in series between said power supply means and a reference potential, and damper diode means and retrace capacitance means coupled between said principal flyback winding and said reference potential, the combination comprising a closed magnetic circuit including a ferrite core and a soft iron core, each said core having pole faces abutting against one another, a shorted turn of non-magnetic conductive material surrounding the juncture of the pole faces of said cores, a winding on each said core, a capacitor, a feedback winding on said flyback transformer, means connecting the winding on said ferrite core and said capacitor in series between said base electrode and said feedback winding, said capacitor and said winding on said ferrite core forming a series resonant circuit adapted to resonate at horizontal deflection frequency, with said feedback winding regeneratively coupling flyback voltage pulses appearing in said flyback transformer to said series resonant circuit, circuit means coupled to said winding on said soft iron core to supply direct current therethrough to thereby vary the resonant frequency of said series resonant circuit, and a semiconductor diode connected between the base and emitter electrodes of said transistor, said semiconductor diode poled oppositely to the base-emitter junction of said transistor.

8. In a television receiver having a deflection system providing a deflection wave having a trace portion and a retrace portion at horizontal deflection frequency to the deflection yoke of a cathode ray tube, said deflection system having a flyback transformer with a principal flyback winding thereon, means for coupling the deflection yoke of the cathode ray tube to the principal flyback winding, direct current power supply means, a switching transistor having collector, emitter and base electrodes, means connecting said principal flyback winding and said collector and emitter electrodes in series between said power supply means and the reference potential, and damper diode and retrace capacitance means coupled between said principal flyback winding and said reference potential, the combination comprising, a closed magnetic circuit including a ferrite core and a soft iron core, each said core having pole faces abutting against one another, a shorted turn of non-magnetic conductive material surrounding the juncture of the pole faces of said cores, a winding on each said core, a capacitor, a first feedback winding on said flyback transformer, means connecting the winding on said ferrite core and said capacitor in series between said base electrode and said first feedback winding, said capacitor and said winding on said ferrite core forming a series resonant circuit adapted to resonate at horizontal deflection frequency, with said first feedback winding regeneratively coupling flyback voltage pulses appearing in said flyback transformer to said series resonant circuit, a phase detector in the receiver having a first input coupled to the output of the synchronizing signal separator circuit of the receiver, a second feedback winding on said flyback transformer coupled to a second input of said phase detector, means coupling the output of said phase detector to said winding on said soft iron core thereby to synchronize the resonant frequency of said series resonant circuit with the horizontal synchronizing pulses of a composite video signal processed in the receiver, and a semiconductor diode connected between base and emitter electrodes of said transistor, said semiconductor diode poled oppositely to the base-emitter junction of said transistor.

References Cited

UNITED STATES PATENTS

| | | | |
|---|---|---|---|
| 2,904,762 | 9/1959 | Schulz | 336—84 |
| 2,996,695 | 8/1961 | Dickinson | 336—155 |
| 3,136,955 | 6/1964 | Binkis | 331—8 |
| 3,155,921 | 11/1964 | Fischman | 331—117 |
| 3,174,074 | 3/1965 | Massman | 315—27 |

ROBERT L. GRIFFIN, *Primary Examiner.*

JOHN W. CALDWELL, *Examiner.*

R. K. ECKERT, *Assistant Examiner.*